July 27, 1965 J. G. STRECKFUS 3,196,720
LATHE TOOL FOR RUBBER
Filed Dec. 21, 1962

INVENTOR
John G. Streckfus
BY Walter G. Finch
ATTORNEY

United States Patent Office 3,196,720
Patented July 27, 1965

3,196,720
LATHE TOOL FOR RUBBER
John G. Streckfus, 232 Margate Road, Timonium, Md.
Filed Dec. 21, 1962, Ser. No. 246,444
4 Claims. (Cl. 82—36)

This invention relates generally to cutting tools, and more particularly it pertains to a lathe tool for truing cylinders of resilient material, such as rubber.

Considerable difficulty has been encountered in the past in lathe turning rubber rollers smoothly and accurately. Because of the risilient nature of the material of the roller, the tool is apt to "bite" in and chatter despite care in grinding the usual cutting tools to special attack angles with various degrees of relief.

To this purpose in the past, tools have been ground to arcuate shapes and even carved away into sharpened hooks. All such schemes require frequent sharpening to be effective and usually work well only for limited depths of cut.

Abrasive arrangements have been resorted to employing high speed wheels held against the work as it is rotated, this generally, as a finishing process subsequent to the rough turning accomplished by the inadequate tools as mentioned.

It is the principal object of this invention to provide a lathe tool arrangement for cutting rubber and rubber-like materials with ease and precision.

Another object of this invention is to provide a lathe tool blade requiring no contoured sharpening for turning resilient materials effectively.

To provide a non-chattering lathe tool having an easily repleacable inexpensive looped cutter blade, is still another object of this invention.

Other objects and advantages of this invention will become more readily apparent and understood from the following detailed specification and single sheet of accompanying drawings in which.

Figure 1:
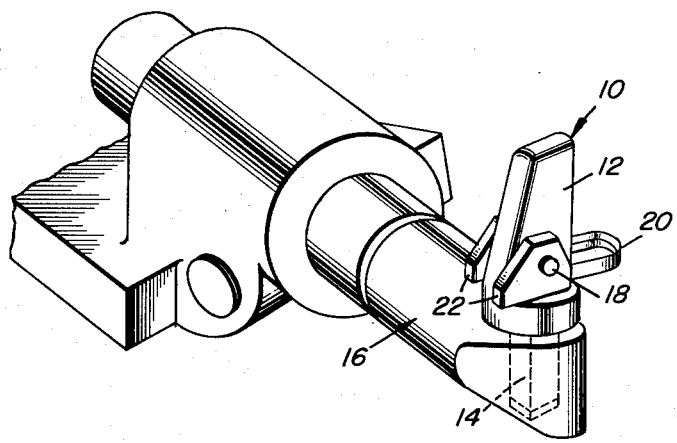
FIG. 1 is a perspective view of the improved lathe tool head mounted in a boring rod incorporating features of this invention.
Figure 2:
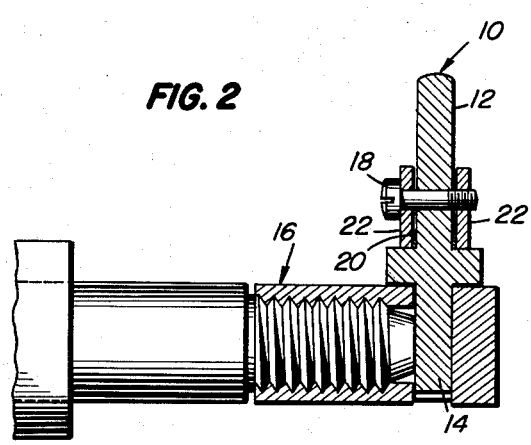
FIG. 2 is a side elevation of the tool head and boring rod of FIG. 1 shown partly in vertical section.

Referring now to the details of the drawings, the tool head 10 is formed from a piece of round stock steel by milling one end on two sides to form a flat 12. The other end of the stock is milled on four sides to form a square shank 14. This shank 14 is made to the same square dimensions as the usual tool bit and consequently can be secured into a conventional boring rod 16 of a lathe as shown best in FIG. 2.

The flat 12 of the tool head 10 is bored transversely for a clamp bolt 18. A cutter blade 20 is secured against the flat 12 by a pair of clamping cheeks 22, one on each side thereof and all tensioned together by the bolt 18.

Figure 4:
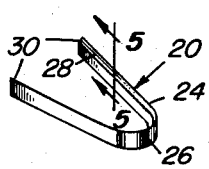
FIG. 4 is a perspective detail view of the cutter blade for the tool head.
Figure 5:
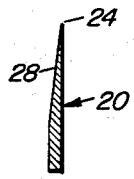
FIG. 5 is a cross section, much enlarged, of the cutter blade taken on line 5—5 of FIG. 4.

As best shown in FIGS. 4 and 5, the cutter blade 20 is formed from a thin, narrow, hardened strip of steel ground the length of one face to a sharp edge 24. This strip is bent back upon itself forming a circular half turn loop 26 having the ground bevel 28 inside and providing a pair of generally parallel extending legs 30.

Figure 3:
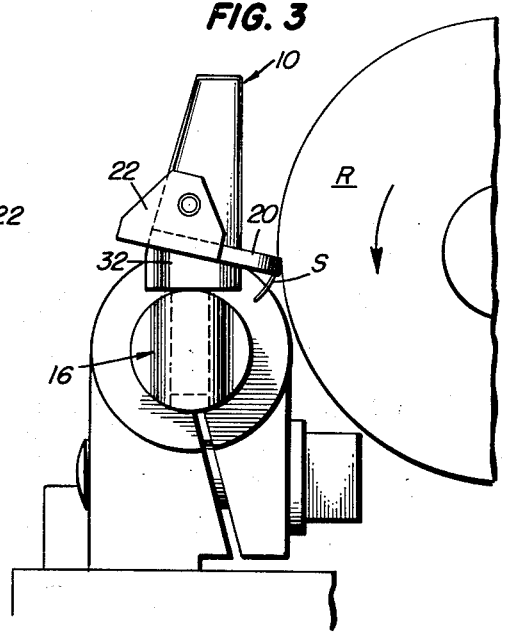
FIG. 3 is an end view of the tool head and boring rod showing the application to work in a lathe.

By means of these legs 30, the cutter blade 20 may be extended or retracted from the tool head 10 to any desired length. The legs 30 bear against the flat 12 and cheeks 22 for a considerable length and consequently the cutter blade is adequately secured against movement. The bevel 28 guides the sliver S being turned from the work, rubber roller R, downwardly through the loop 26 instead of curling upward as usual with conventional lathe tools (see FIG. 3).

If desired, when the flat 12 is machined the shoulder 32 of the tool head 10 may be cut at an angle as shown to better position the cutter blade 20. When the blade 20 becomes dull, it is most economical to discard and replace it with a new one and this can be done in a few seconds by merely loosening clamp bolt 18.

Obviously many modifications and variations of the present invention are possible in light of the above teachings. It is, therefore, to be understood that within the scope of the appended claims the invention may be practiced otherwise than as specifically described.

What is claimed is:

1. In a lathe having mounted thereon a boring rod, with said boring rod having an aperture suitable for receiving and positioning a tool bit, a member having a shank at one end for reception and positioning by said aperture in said boring rod, a pair of substantially flat sides at the other end thereof, and a pair of shelf portions formed intermediate said shank and said flat sides, a cutter blade having a loop portion and a pair of leg portions extending therefrom, with said loop portion having a cutting edge therein, and means to clamp said leg portions against said flat sides with a longitudinal edge of each of said leg portions supported by a corresponding shelf portion.

2. In the lathe as recited in claim 1, wherein each said shelf portion is downwardly inclined so as to support said cutter blade in a downwardly inclined position.

3. In the lathe as recited in claim 1, wherein said aperture in said boring rod is square and said shank of said member is correspondingly shaped.

4. In the lathe as recited in claim 1, wherein said means to clamp comprises a pair of plate members arranged to sandwich the leg portions of said cutter blade against their respective flat sides of said member and an element to secure said plate members against said leg portions with said element being free of contact with said cutter blade.

References Cited by the Examiner

UNITED STATES PATENTS

| | | |
|---|---|---|
| 1,723,221 | 8/29 | Vandervoort et al. |
| 1,916,258 | 7/33 | Errig et al. |
| 2,000,129 | 5/35 | Dunnam. |
| 2,015,635 | 9/35 | Errig et al. |
| 2,350,375 | 6/44 | Stephens. |

OTHER REFERENCES

Horner: Metal Tuning, 4th edition, London, England, Sir Isaac Pitman and Sons, Ltd., 1924, pages 63–64. TJ1215 H 82.

WILLIAM W. DYER, JR., *Primary Examiner.*